Patented Nov. 17, 1931

1,832,234

UNITED STATES PATENT OFFICE

FRIEDRICH MUTH, OF ELBERFELD, GERMANY, ASSIGNOR TO GENERAL ANILINE WORKS, INC., OF NEW YORK, N. Y., A CORPORATION OF DELAWARE

SULFUR DYESTUFFS

No Drawing. Application filed December 9, 1929, Serial No. 412,937, and in Germany September 15, 1927.

The present invention relates to sulfur dyestuffs dyeing violet to green shades, which dyes are obtainable by reacting with sulfur upon a compound of the probable general formula:

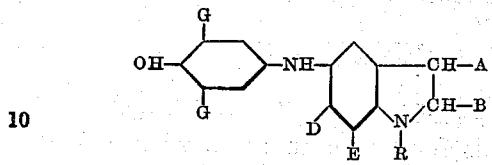

wherein A and B stand jointly for the grouping —$(CH_2)_3$—, —$(CH_2)_4$— or —$(CH_2)_5$—, D and E stand for hydrogen or jointly for the grouping —CH=CH—CH=CH— or —$CH_2$—$CH_2$—$CH_2$—$CH_2$—, G stands for hydrogen or chlorine and R stands for hydrogen, alkyl, aralkyl or aryl.

In my copending application Ser. No. 407,007, filed November 13, 1927, continuation in part of Ser. No. 252,680, filed February 7th, 1928 I have described that compounds of the probable general formula:

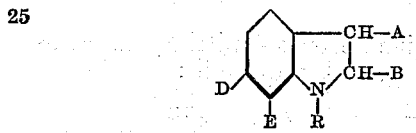

wherein A, B, D, E and R have the same meaning as in the above formula, will produce compounds having in their leuco form the first probable general formula, when caused to be reacted upon by p-aminophenols, quinone-halogenimides or p-nitrosophenols according to the conditions usually employed for the production of indophenols from indoles. The indophenolic compounds thus obtainable form deep red to violet colored alkaline solutions, which are easily reduced to the corresponding leuco-indophenols which latter are yellowish to brownish colored crystalline substances, easily soluble in water, alcohol and sulfuric acid. The alkaline solutions of the leuco indophenols are easily reoxidized, for instance by action of atmospheric oxygen, to the corresponding indophenols.

Now I have found that by submitting these novel indophenolic compounds or their leuco derivatives to a sulfur fusion novel sulfur dyestuffs are produced. The products obtained in both cases are substantially identical; when using the indophenolic compounds, these are presumably primarily reduced to the leuco indophenolic compounds in the sulfur melt. I wish it therefore to be understood that the term indophenolic compound is used herein as generic for both the indophenolic compounds and their leuco derivatives.

The conditions of the sulfur fusion can be varied within wide limits without departing from the spirit of my invention. I prefer, however, to use an alcoholic polysulfide fusion.

My novel sulfur dyestuffs are in the dry state dark violet to black powders, they are soluble in sodium sulfide solutions, from which cotton is dyed violet to green shades exceedingly fast to light and boiling. They can also be reduced to form hydrosulfite vats, from which cotton is dyed in similar shades.

The following example will illustrate my invention without limiting it thereto:

*Example.*—280 parts by weight of the leuco indophenol from hexahydrocarbazole and para-aminophenol having most probably the general formula:

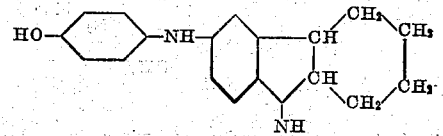

are melted for about 80 hours at 150–160° C. with 690 parts by weight of calcined sodium sulfide, 830 parts by weight of sulfur and 1200 parts by weight of alcohol of 95%.

The alcohol is then distilled off with the addition of water and the dyestuff which separates is filtered. The residue is treated with suitable organic solvents dissolving sulfur or freed from sulfur by means of the exactly calculated quantity of sodium sulfide, the residue is then washed and dried. The dyestuff forms in the dry state a blueish black powder, insoluble in organic solvents. It dyes cotton from a sodium sulfide bath in blueish violet shades. The dyeings are very fast to light and boiling.

The following table indicates the starting materials and shades of some other sulfur dyestuffs falling within the scope of my invention:

(6 - hexahydrocarbazole) - (4' - hydroxy - 3', 5' - dichlorophenyl)-amine — blueish violet (6 - N - ethyl - hexahydro - carbazole) - (4' - hydroxyphenyl)-amine — blue (6 - N - phenyl - hexahydro - carbazole) - (4' - hydroxyphenyl)-amine — dark blue (5-tetrahydropentindole)-(4'-hydroxyphenyl)-amine — violet (7-hexahydroheptindole)-(4'-hydroxyphenyl)-amine — blueish violet

[6-(7, 8 - tetrahydronaphtho-hexahydrocarbazole)]-(4'-hydroxyphenyl)-amine — blue

[6-(7, 8-naphtho-hexahydro-carbazole)]-4'-hydroxyphenyl)-amine — bluish-green
(preferably in presence of copper or its salts as cuprous sulfate, cuprous sulfide)

This application is a continuation in part of my application Ser. No. 303,111, filed August 30, 1928.

I claim:

1. New sulfur dyestuffs which in the dry state form violet to black powders, dyeing cotton from a sodium sulfide bath violet to green shades particularly fast to light and boiling, which are substantially identical with the products obtainable by submitting to a polysulfide fusion, a compound having in its leuco form the probable general formula:

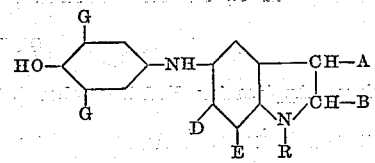

wherein A and B stand jointly for the grouping $-(CH_2)_3-$, $-(CH_2)_4-$, or $-(CH_2)_5-$, D and E stand for hydrogen or jointly for the grouping $$-CH=CH-CH=CH-$$

or $$-CH_2-CH_2-CH_2-CH_2-,$$

G stands for hydrogen or chlorine and R stands for hydrogen, alkyl, aralkyl or aryl.

2. A new sulfur dyestuff which in the dry state forms a blueish black powder dyeing cotton from a sodium sulfide bath blueish violet shades particularly fast to light and boiling, which is substantially identical with the product obtainable by submitting the compound of the probable formula:

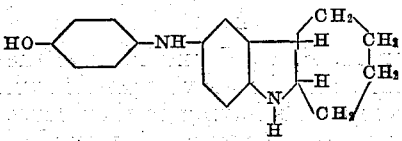

to a polysulfide fusion.

3. A new sulfur dyestuff dyeing cotton from a sodium sulfide bath bluish-violet shades particularly fast to light and boiling, which is substantially identical with the product obtainable by submitting the compound of the probable formula:

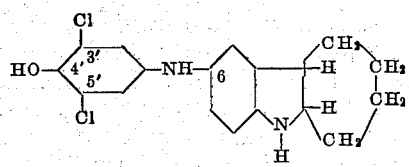

to a polysulfide fusion.

4. A new sulfur dyestuff dyeing cotton from a sodium sulfide bath blue shades particularly fast to light and boiling, which is substantially identical with the product obtainable by submitting the compound of the probable formula:
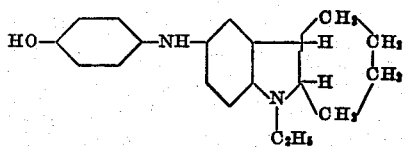
to a polysulfide fusion.
In testimony whereof, I affix my signature.
FRIEDRICH MUTH.